(12) United States Patent
Maruya

(10) Patent No.: US 8,721,916 B2
(45) Date of Patent: May 13, 2014

(54) REFRIGERANT COMPOSITION

(75) Inventor: Richard H. Maruya, Kaneohe, HI (US)

(73) Assignee: A.S. Trust & Holdings Inc., Saipan (AE)

( * ) Notice: Subject to any disclaimer, the term of this patent is extended or adjusted under 35 U.S.C. 154(b) by 381 days.

(21) Appl. No.: 13/106,701

(22) Filed: May 12, 2011

(65) Prior Publication Data

US 2012/0286193 A1    Nov. 15, 2012

(51) Int. Cl.
*C09K 5/04* (2006.01)
*C11D 7/24* (2006.01)

(52) U.S. Cl.
USPC ............................................ 252/67; 510/407

(58) Field of Classification Search
USPC ............................................ 252/67; 510/407
See application file for complete search history.

(56) References Cited

U.S. PATENT DOCUMENTS

| | | | |
|---|---|---|---|
| 1,497,615 A | 6/1924 | Thompson | |
| 1,976,204 A | 10/1934 | Vanderveer et al. | |
| 4,336,046 A | 6/1982 | Schorre et al. | |
| 5,287,703 A * | 2/1994 | Bernhard et al. | 62/627 |
| 5,360,566 A * | 11/1994 | Stevenson | 252/67 |
| 5,705,471 A * | 1/1998 | Minor et al. | 510/408 |
| 6,248,256 B1 * | 6/2001 | Nagao et al. | 252/68 |
| 6,327,866 B1 * | 12/2001 | Novak et al. | 62/114 |
| 6,336,333 B1 | 1/2002 | Lindgren | |
| 6,846,792 B2 * | 1/2005 | Minor et al. | 510/408 |
| 6,863,840 B2 * | 3/2005 | Goble | 252/67 |
| 6,902,686 B2 * | 6/2005 | Maruya | 252/67 |
| 7,413,675 B2 * | 8/2008 | Minor | 252/68 |
| 2005/0051756 A1 * | 3/2005 | Maruya | 252/73 |
| 2007/0275865 A1 * | 11/2007 | Tagawa et al. | 508/438 |
| 2008/0178617 A1 | 7/2008 | Jones et al. | |
| 2010/0147024 A1 | 6/2010 | Roberts et al. | |
| 2010/0320413 A1 | 12/2010 | Maruya | |

FOREIGN PATENT DOCUMENTS

| | | |
|---|---|---|
| CN | 101157849 A | 4/2008 |
| EP | 1 094 100 A1 | 4/2001 |
| GB | 2 228 739 A | 9/1990 |
| JP | 10205899 A * | 8/1998 |
| KR | 2002070177 A * | 9/2002 |

OTHER PUBLICATIONS

Y. S. Chang et al., "Performance and heat transfer characteristics of hydrocarbon refrigerants in a heat pump system", International Journal of Refrigeration, 23 (2000), 232-242.*
Wu et al., TI Study of using hydrocarbons, R152a and their mixtures as alternatives for R12, Journal of Engineering Thermophysics, 15, 3, Aug. 1994, 233-236.*
English translation of KR2002-0070177, Sep. 5, 2002.*

* cited by examiner

*Primary Examiner* — Douglas Mc Ginty
(74) *Attorney, Agent, or Firm* — Richard C. Litman

(57) ABSTRACT

The refrigerant composition is a hydrocarbon-based composition that may be used as a refrigerant for air conditioners, refrigerators or the like, and further, which may be used as a detergent for cleaning precision components, such as semiconductor chips, motherboards or the like. The refrigerant composition preferably includes, by volume, between 50% and 65% propylene, between 30% and 45% propane, and between 5% and 10% isobutane. In a preferred embodiment, the refrigerant composition contains about 40% propane, about 55% propylene, and about 5% isobutane (methyl propane) by volume.

1 Claim, No Drawings

REFRIGERANT COMPOSITION

BACKGROUND OF THE INVENTION

1. Field of the Invention

This present invention relates to hydrocarbon compositions, and more particularly to a hydrocarbon refrigerant containing propane, propylene, and isobutane for air conditioners, refrigerators or the like. The composition may also be used for cleaning semiconductor chips, motherboards or the like.

2. Description of the Related Art

Chlorofluorocarbons (CFC), such as dichlorodifluoromethane and monochlorodifluoromethane, have been used as refrigerants for air conditioners, refrigerators and the like. Such compositions have also been used for the dual function of cleaning or washing precision components, such as semiconductor chips and the like. CFCs have been used due to their relatively safe incombustibility, high stability, and low toxicity. However, CFCs are known to aid in the depletion of the Earth's ozone layer, thus exerting a dangerous influence upon the global environment. Due to this reason, the production and use of CFCs have been gradually reduced, and few CFCs are in use today.

A wide variety of alternatives for chlorofluorocarbons have been introduced as refrigerants and detergents. Hydrofluorocarbons (HFCs), for example, such as 1,1,1,2-tetrafluoroethane and 1,1,1-trifloroethane are presently being utilized as replacements for CFCs. HFCs, however, also cause degradation of the ozone layer, though to a lesser extent. Further, HFCs act as greenhouse gases, contributing to global warming.

Hydrocarbon mixtures are presently being explored as replacements for CFCs and HFCs, due to their relatively benign effect on the environment. Conventional hydrocarbon compositions are generally used in combination with CFCs, HFCs or the like and, therefore, still provide some level of environmental hazard. Thus, a need exists for hydrocarbon compositions capable of being independently used as a refrigerant.

One prior hydrocarbon refrigerant composition consists solely of a mixture of propane and butane. However, such a composition tends to decompose into its individual components (i.e., propane and butane) when leaking outside a cooling system or other apparatus. As a result, the refrigerant left in the cooling system may also break down, requiring full replacement of the refrigerant, and possibly damaging the cooling apparatus.

Further, such a refrigerant has a low ignition temperature, on the order of 400° C. Thus, the use of such a composition presents a safety hazard to those around the cooling apparatus.

None of the above inventions and patents, taken either singly or in combination, is seen to describe the instant invention as claimed. Thus, a refrigerant composition solving the aforementioned problems is desired.

SUMMARY OF THE INVENTION

The refrigerant composition is a hydrocarbon-based composition that may be used as a refrigerant for air conditioners, refrigerators or the like, and further, which may be used as a detergent for cleaning precision components, such as semiconductor chips, motherboards or the like. The refrigerant composition preferably includes, by volume, between 50% and 65% propylene, between 30% and 45% propane, and between 5% and 10% isobutane. In a preferred embodiment, the refrigerant composition contains about 40% propane, about 55% propylene, and about 5% isobutane (methyl propane) by volume. It should be understood that this preferred composition may include variations in the volume concentrations, as desired.

These and other features of the present invention will become readily apparent upon further review of the following specification and drawings.

DETAILED DESCRIPTION OF THE PREFERRED EMBODIMENTS

The refrigerant composition includes propane, propylene and isobutane, in combination. The hydrocarbon composition may be used as a refrigerant having a relatively high ignition temperature with minimal environmental impact.

The hydrocarbon composition preferably includes, by volume, between 50% and 65% propylene, between 30% and 45% propane, and between 5% and 10% isobutane. In a preferred embodiment, the refrigerant composition contains about 40% propane, about 55% propylene, and about 5% isobutane (methyl propane) by volume. It should be understood that this preferred composition may include variations in the volume concentrations, as desired.

The refrigerant composition may be used as a replacement for a conventional refrigerant. For example, chlorodifluoromethane or difluoromonochloromethane is a hydrochlorofluorocarbon (HCFC), once commonly used as a propellant and in air conditioning applications. This gas is commonly known as HCFC-22 or R-22. Its use in these applications is being phased out due to ozone depletion potential and status as a potent greenhouse gas. The present refrigerant composition may be used as a replacement for R-22, since it has no ozone depletion potential and no known greenhouse effects. Further, only 30% of the present refrigerant composition is needed to replace R-22, with energy savings estimated between approximately 30% and 45%. This allows the refrigerator or air conditioner (or similar apparatus) to use less energy for the same result.

EXAMPLE

A 2-ton air conditioning system was charged with 2.6 pounds of R-22 refrigerant. The system showed a suction pressure of 65 p.s.i. and a discharge pressure of 230 p.s.i. Relevant parameters included: suction line temperature 66° F.; discharge line temperature 162° F.; ambient temperature 85° F.; condenser discharge air temperature 96°; supply air temperature 56° F.; and return air temperature 71° F. The system was drained of refrigerant, and then filled with 12 ounces of a refrigerant composition containing 40% propane, 55% propylene, and 5% isobutane (methyl propane) by volume. The system showed a suction pressure of 60 p.s.i. and a discharge pressure of 242 p.s.i. Relevant parameters included: suction line temperature 64° F.; discharge line temperature 176° F.; ambient temperature 85° F.; condenser discharge air temperature 96°; supply air temperature 56° F.; and return air temperature 71° F. Thus, the present inventive composition provides the same performance with only 30% of the total amount of refrigerant.

In addition to use as a refrigerant, the present refrigerant composition of approximately 40% propane, approximately 55% propylene, and approximately 5% isobutane by volume may be used as a detergent, cleaner or the like for high precision and delicate electronic components, such as semiconductor chips, motherboards and the like.

It is to be understood that the present invention is not limited to the embodiments described above, but encompasses any and all embodiments within the scope of the following claims.

I claim:

1. A refrigerant composition, consisting of, by volume:
about 55% propylene;
about 40% propane; and
about 5% isobutane.

* * * * *